(12) United States Patent
Sorenson et al.

(10) Patent No.: US 9,037,817 B2
(45) Date of Patent: May 19, 2015

(54) DEVICE TYPE OVERRIDE

(75) Inventors: Ellen L. Sorenson, Mounds View, MN (US); Roger V. Ritchie, Colorado Springs, CO (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 13/420,934

(22) Filed: Mar. 15, 2012

(65) Prior Publication Data

US 2013/0246700 A1 Sep. 19, 2013

(51) Int. Cl.
*G06F 12/16* (2006.01)
*G06F 11/14* (2006.01)

(52) U.S. Cl.
CPC ........ *G06F 11/1469* (2013.01); *G06F 11/1456* (2013.01)

(58) Field of Classification Search
None
See application file for complete search history.

(56) References Cited

U.S. PATENT DOCUMENTS

| | | | |
|---|---|---|---|
| 8,255,666 B2* | 8/2012 | Eguchi | 711/203 |
| 8,412,896 B1* | 4/2013 | Chellappa et al. | 711/162 |
| 2003/0126327 A1* | 7/2003 | Pesola et al. | 710/74 |
| 2012/0079276 A1* | 3/2012 | Evans et al. | 713/170 |

* cited by examiner

*Primary Examiner* — Gary Portka
(74) *Attorney, Agent, or Firm* — Richard J. Gregson

(57) ABSTRACT

A backup system override may be specified to allow a backup system to access a backup created on an old storage device. For example, an archival backup may be accessed long after the storage device that created the backup has been decommissioned. The file history information in the backup may specify a storage device no longer accessible by the backup system. An override in the backup system allows the backup system to access the backup with the file history information through a different storage device than the storage device that created the backup. The different storage device may have a different name and/or be of a different type than the original storage device that created the backup. The override may also allow access to command scripts and links in the backup.

14 Claims, 5 Drawing Sheets

DEVICE TYPE OVERRIDE

The instant disclosure relates to computer systems. More specifically, this disclosure relates to backup systems for a computer system.

BACKGROUND

Backup systems are a vital part of a computer system. The ability to backup data provides security that the valuable data and time invested in processing the data by the computer system is not lost. Thus, backups should be as robust and reliable as possible. Many backups are designed to be archival in nature, such that the backup is maintained for a long period of time. Because computer technology often changes rapidly, even over only a year or two, the backup system used may become obsolete while the backup created by the backup system remains in storage. For example, new and improved backup systems may be installed, which access different types or sizes of storage devices. If reference is made to the archival backup, new backups systems must be able to access the data without performing a conversion of the backup.

SUMMARY

According to one embodiment, a method includes reading a file reference having a link to a file in a storage device of a first type. The method also includes determining whether an override is set. The method further includes when the override is set, reading the storage device to obtain the file in a manner consistent with a storage device of a second type different from the first type.

According to another embodiment, a computer program product includes a non-transitory computer readable medium having code to read a file reference having a link to a file in a storage device of a first type. The medium also includes code to determine whether an override is set for the file reference. The medium further includes code to read the storage device to obtain the file in a manner consistent with a storage device of a second type, different from the first type, when the override is set.

According to a further embodiment, an apparatus includes a memory, a storage device, and a processor coupled to the memory and the first storage device. The processor is configured to read a file reference having a link to a file in the storage device of a first type. The processor is also configured to determine whether an override is set. The processor is further configured to read the storage device to obtain the file in a manner consistent with a storage device of a second type, different from the first type, when the override is set.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Backup systems may be adapted for backward compatibility with backups created on older storage devices. A file history database is created along with a backup, which remains a part of the actual data backed up. The file history information provides links to the files in the backup particular to the storage device. For example, a link in the file history may specify a certain tape and/or track on the tape. When the tape backup is accessed by a storage device of a different type, the file history information remains unaltered. Thus, the links may not be accurate. An override may be established to allow a backup system to access a backup stored on a tape having a different type from the storage device that originally created the backup.

According to one embodiment, the override may be implemented to allow moving data to a backup system having a different physical device for accessing drives containing the backup. For example, a backup may be moved from a production system to a test system. The test system may have a different physical device, but the user may desire to execute the same command scripts and access the same backup information as available on the production system. When the override is set, the test system may execute commands and access files on the backup as if the physical device on the test system is the same type of physical device on the production system.

Figure 1:
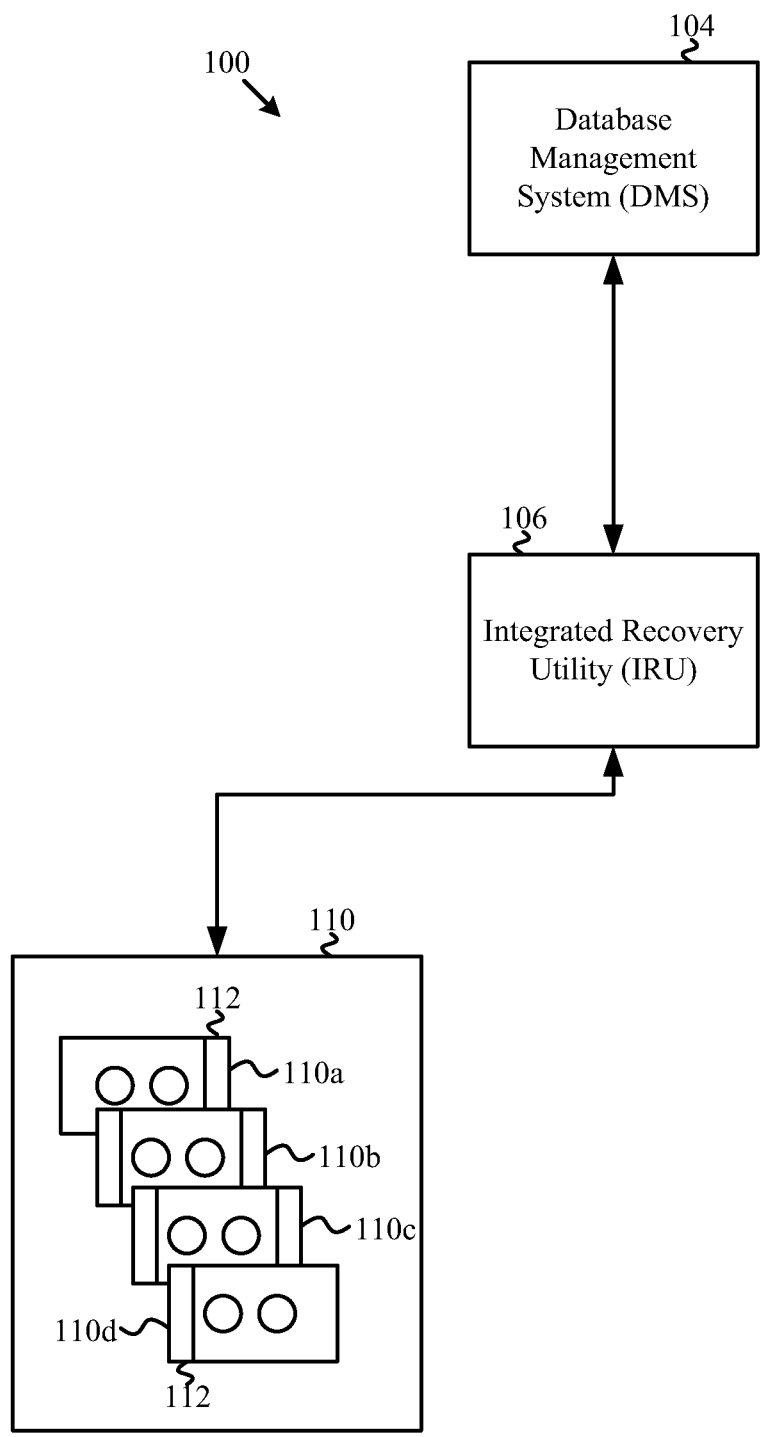
FIG. 1 is a block diagram illustrating a backup system for storing files in a database system according to one embodiment of the disclosure.

FIG. 1 is a block diagram illustrating a backup system for storing files in a database system according to one embodiment of the disclosure. A database management system (DMS) 104 may be coupled to an integrated recovery utility (IRU) 106 for performing backups and/or recovery of a database file. The IRU 106 may have access to a backup 110. The backup 110 may include a number of drives 110*a-d*, such as tapes that store a backup of the DMS 104. Data stored on the drives 110*a-d* include a default set 112 having history information for the first backup 110. The history information may include, for example, links between the drives 110*a-d* identifying the starts and ends of files and start and end timestamps. Although the default set 112 is illustrated as stored across the drives 110*a-d*, the default set 112 may be stored on only one or a few of the drives 110a-d or may be stored on a separate storage device (not shown). According to one embodiment, the default set 112 may be stored in memory within the IRU 106.

When the device that created the backup 110 is replaced with a different device, the backup 110 may be accessed by the different device by setting an override. For example, data written using the new device type may not be read using the old device type, but the new device type may be capable of reading data written using the old device type. Because, the device types are not interchangeable, the new device type may be assigned a different device type identifier during an override.

Figure 2:
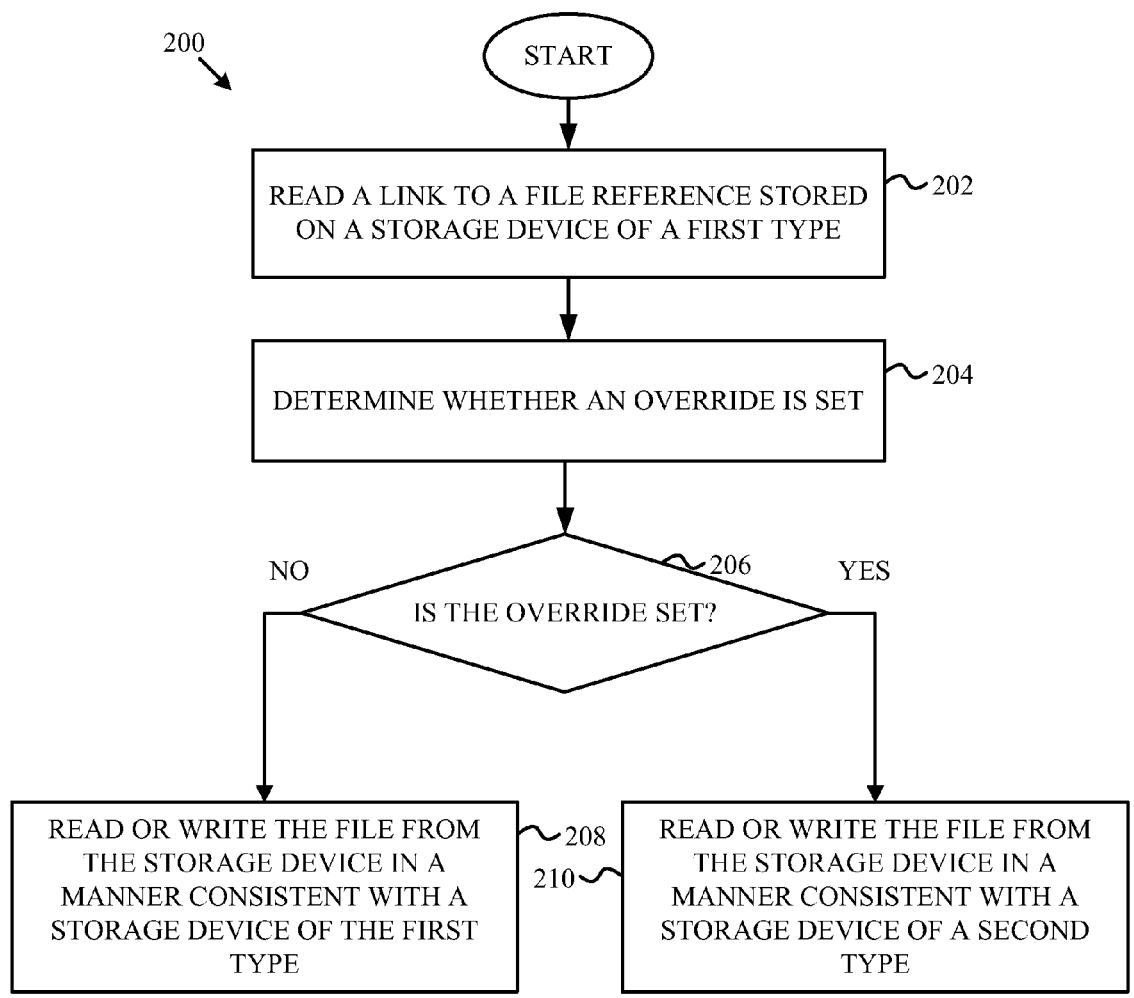
FIG. 2 is a flow chart illustrating a method of overriding a storage device type according to one embodiment of the disclosure.

FIG. 2 is a flow chart illustrating a method of overriding a storage device type according to one embodiment of the disclosure. At block 202, a file reference is read to obtain a link to a file stored on a first storage device of a first type. The file reference may be, for example, a history database, a command, or a backup. For example, the link may point to a file residing on a first tape.

At block 204, the computer system determines if an override for the storage device is set. In the event the backup storing the file and file history information has moved to a second storage device of a second type, the file history information continues to point to the first storage device. For example, the file history information, and links contained in the file history information, are retained along with the backup without modifying the links. The override may be set to allow the second storage device of the second type to access data on drives recorded by the first storage device of the first type.

At block 206, if the override is not set, then the method 200 proceeds to block 208. At block 208, the file pointed to by the link is accessed on the first storage device in a manner consistent with a storage device of the first type. The read and/or write operation at block 208 may be a standard operation. When the override has not been set, the storage device containing the file pointed to by the link is of the same type of storage drive with the same name as the storage device used to initially request or create the backup and the file history database.

At block 206, if the override is set, then the method 200 proceeds to block 210. An override may be set on the backup system accessing the backup when a backup is accessed from a different storage device of a different type. The override signals the computer system that the storage device containing the file is of a different type than the type that originally stored the file when the file history database was created. Along with the override a different type and/or a different name may be specified. Thus, at block 210 the file pointed to by the link may be accessed from the first storage device in a manner consistent with a storage device of a second type. For example, the backup containing the file and the file history database may have been created on a set of 15 GB tapes but accessed by a device for 75 GB tapes. In another example, the backup containing the file and the file history database may have been created on a set of 15 GB tapes on a device named 'TAPED01,' but because the device named 'TAPED01' has been replaced by a device named 'TAPENEW05,' the device named 'TAPENEW05' may be accessed as though it was the 'TAPED01' device. In other examples, the new device may have a different density or speed than the original device.

Figure 3:
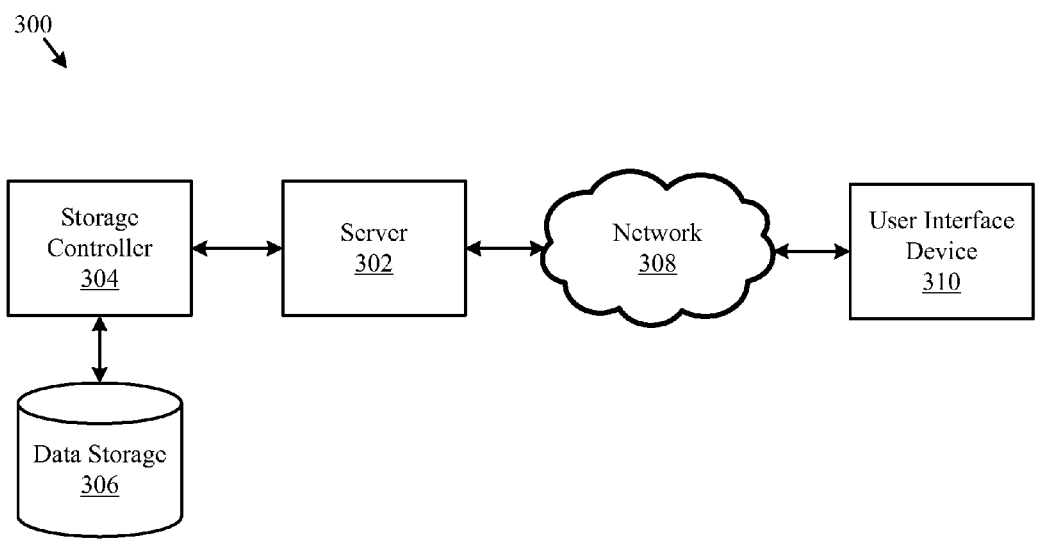
FIG. 3 is block diagram illustrating a computer network according to one embodiment of the disclosure.

FIG. 3 illustrates one embodiment of a system 300 for an information system. The system 300 may include a server 302, a data storage device 306, a network 308, and a user interface device 310. The server 302 may be a dedicated server or one server in a cloud computing system. In a further embodiment, the system 300 may include a storage controller 304, or storage server configured to manage data communications between the data storage device 306 and the server 302 or other components in communication with the network 308. In an alternative embodiment, the storage controller 404 may be coupled to the network 308.

In one embodiment, the user interface device 310 is referred to broadly and is intended to encompass a suitable processor-based device such as a desktop computer, a laptop computer, a personal digital assistant (PDA) or tablet computer, a smartphone or other a mobile communication device having access to the network 308. When the device 310 is a mobile device, sensors (not shown), such as a camera or accelerometer, may be embedded in the device 310. When the device 310 is a desktop computer the sensors may be embedded in an attachment (not shown) to the device 310. In a further embodiment, the user interface device 310 may access the Internet or other wide area or local area network to access a web application or web service hosted by the server 302 and provide a user interface for enabling a user to enter or receive information.

The network 308 may facilitate communications of data, such as authentication information, between the server 302 and the user interface device 410. The network 308 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

In one embodiment, the user interface device 310 accesses the server 302 through an intermediate sever (not shown). For example, in a cloud application the user interface device 310 may access an application server. The application server fulfills requests from the user interface device 310 by accessing a database management system (DBMS). In this embodiment, the user interface device 310 may be a computer or phone executing a Java application making requests to a JBOSS server executing on a Linux server, which fulfills the requests by accessing a relational database management system (RDMS) on a mainframe server.

Figure 4:
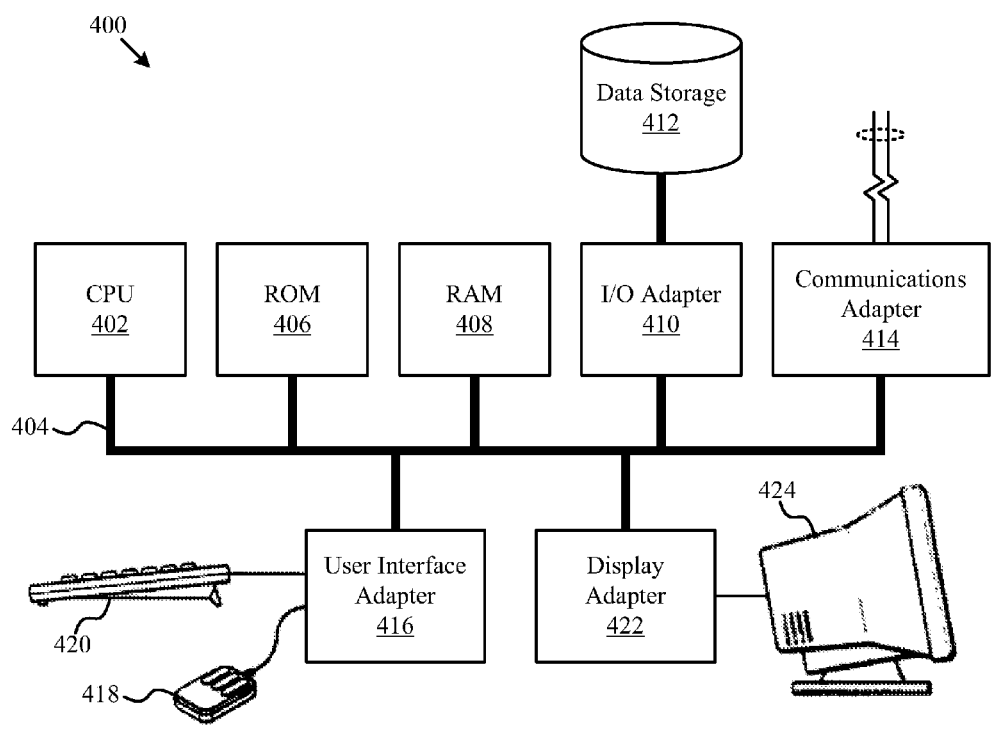
FIG. 4 is a block diagram illustrating a computer system according to one embodiment of the disclosure.

FIG. 4 illustrates a computer system 400 adapted according to certain embodiments of the server 302 and/or the user interface device 310. The central processing unit ("CPU") 402 is coupled to the system bus 404. The CPU 402 may be a general purpose CPU or microprocessor, graphics processing unit ("GPU"), and/or microcontroller. The present embodiments are not restricted by the architecture of the CPU 402 so long as the CPU 402, whether directly or indirectly, supports the operations as described herein. The CPU 402 may execute the various logical instructions according to the present embodiments.

The computer system 400 also may include random access memory (RAM) 408, which may be synchronous RAM (SRAM), dynamic RAM (DRAM), synchronous dynamic RAM (SDRAM), or the like. The computer system 400 may utilize RAM 408 to store the various data structures used by a software application. The computer system 400 may also include read only memory (ROM) 406 which may be PROM, EPROM, EEPROM, optical storage, or the like. The ROM may store configuration information for booting the computer system 400. The RAM 408 and the ROM 406 hold user and system data.

The computer system 400 may also include an input/output (I/O) adapter 410, a communications adapter 414, a user interface adapter 416, and a display adapter 422. The I/O adapter 410 and/or the user interface adapter 416 may, in certain embodiments, enable a user to interact with the computer system 400. In a further embodiment, the display adapter 422 may display a graphical user interface (GUI) associated with a software or web-based application on a display device 424, such as a monitor or touch screen.

The I/O adapter 410 may couple one or more storage devices 412, such as one or more of a hard drive, a solid state storage device, a flash drive, a compact disc (CD) drive, a floppy disk drive, and a tape drive, to the computer system 400. According to one embodiment, the data storage 412 may be a separate server coupled to the computer system 400 through a network connection to the I/O adapter 410. The communications adapter 414 may be adapted to couple the computer system 400 to the network 308, which may be one or more of a LAN, WAN, and/or the Internet. The communications adapter 414 may also be adapted to couple the computer system 400 to other networks such as a global positioning system (GPS) or a Bluetooth network. The user interface adapter 416 couples user input devices, such as a keyboard 520, a pointing device 418, and/or a touch screen (not shown) to the computer system 400. The keyboard 420 may be an on-screen keyboard displayed on a touch panel. Additional devices (not shown) such as a camera, microphone, video camera, accelerometer, compass, and or gyroscope may be coupled to the user interface adapter 416. The display adapter 422 may be driven by the CPU 402 to control the display on the display device 424. Any of the devices 402-422 may be physical, logical, or conceptual.

The applications of the present disclosure are not limited to the architecture of computer system 400. Rather the computer system 400 is provided as an example of one type of computing device that may be adapted to perform the functions of a server 302 and/or the user interface device 310. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. For example, the computer system 600 may be virtualized for access by multiple users and/or applications.

Figure 5A:
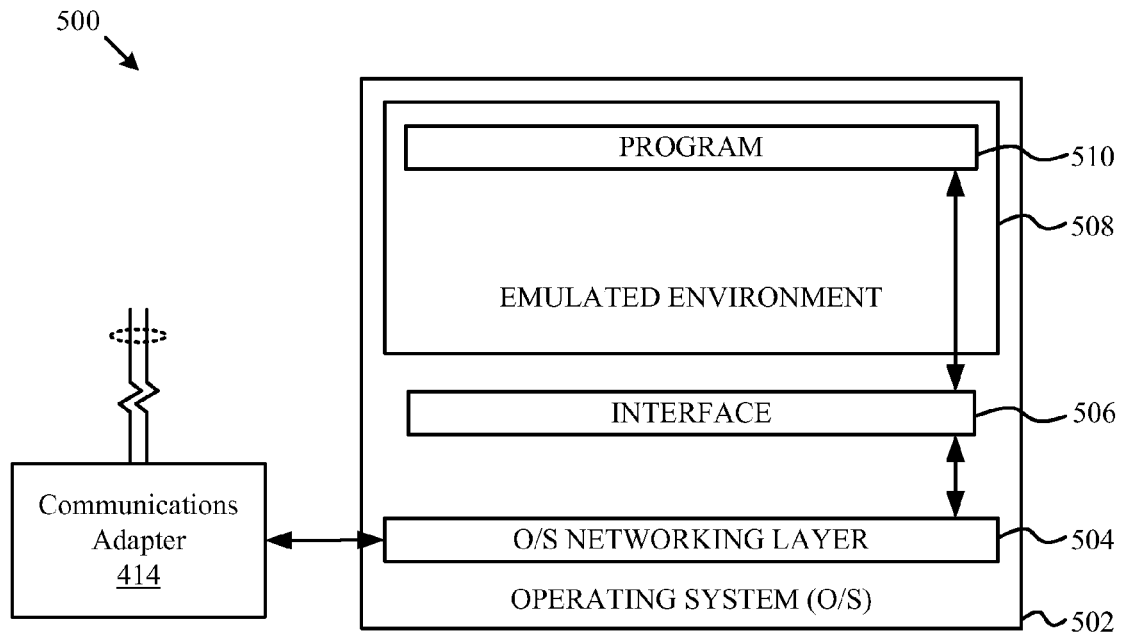
FIG. 5A is a block diagram illustrating a server hosting an emulated software environment for virtualization according to one embodiment of the disclosure.

FIG. 5A is a block diagram illustrating a server hosting an emulated software environment for virtualization according to one embodiment of the disclosure. An operating system 502 executing on a server includes drivers for accessing hardware components, such as a networking layer 504 for accessing the communications adapter 414. The operating system 502 may be, for example, Linux. An emulated environment 508 in the operating system 502 executes a program 510, such as CPCommOS. The program 510 accesses the networking layer 504 of the operating system 502 through a non-emulated interface 506, such as XNIOP. The non-emulated interface 506 translates requests from the program 510 executing in the emulated environment 508 for the networking layer 504 of the operating system 502.

Figure 5B:
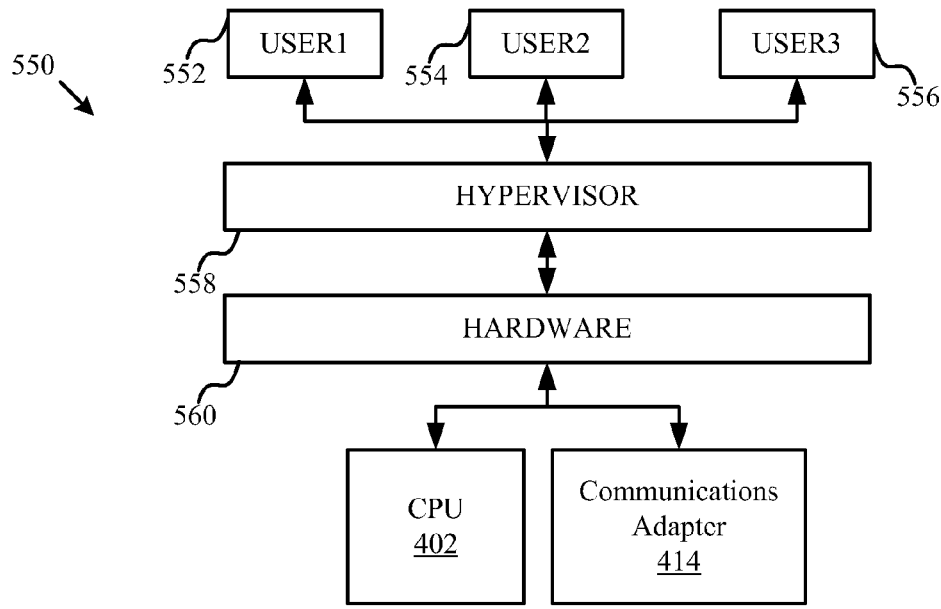
FIG. 5B is a block diagram illustrating a server hosing an emulated hardware environment according to one embodiment of the disclosure.

In another example, hardware in a computer system may be virtualized through a hypervisor. FIG. 5B is a block diagram illustrating a server hosing an emulated hardware environment according to one embodiment of the disclosure. Users 552, 554, 556 may access the hardware 560 through a hypervisor 558. The hypervisor 558 may be integrated with the hardware 560 to provide virtualization of the hardware 560 without an operating system, such as in the configuration illustrated in FIG. 5A. The hypervisor 558 may provide access to the hardware 560, including the CPU 402 and the communications adaptor 414.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method, comprising:
    reading a file reference having a link to a file in a backup created using a first storage device;
    determining whether an override is set;
    when the override is set, reading the file from the backup using a second storage device in a manner consistent with the second storage device which is different from the first storage device, wherein the backup is an original version created in a format consistent with the first storage device; and
    receiving an instruction to set the override before reading the file reference.

2. The method of claim 1, in which the storage device is a tape drive.

3. The method of claim 2, in which the first storage device has a first capacity, and the second storage device has a second capacity different from the first capacity.

4. The method of claim 1, in which the step of reading the file from the backup in a manner consistent with the second storage device comprises reading from a storage device having a different name than specified by the file reference.

5. The method of claim 1, further comprising when the override is set, writing using the second storage device in a manner consistent with a storage type of the first storage device.

6. A computer program product, comprising:
 a non-transitory computer readable medium comprising:
  code to read a file reference having a link to file in a backup created using a first storage device;
  code to determine whether an override is set;
  code to read the file from the backup using a second storage device in a manner consistent with the second storage device, which is different from the first storage device, when the override is set, wherein the backup is an original version created in a format consistent with the first storage device; and
  code to receive an instruction to set the override before reading the file reference.

7. The computer program product of claim 6, in which the storage device is a tape drive.

8. The computer program product of claim 7, in which the first storage device has a first capacity, and the second storage device has a second capacity different from the first capacity.

9. The computer program product of claim 6, in which the medium further comprises code to read from a storage device having a different name than specified by the file reference.

10. An apparatus, comprising:
 a memory;
 a storage device; and
 a processor coupled to the memory and the storage device, in which the processor is configured:
  to read a file reference having a link to a file in a backup created using an alternate storage device;
  to determine whether an override is set;
  to read the file from the backup using the storage device in a manner consistent with the storage device, different from the alternate storage device, when the override is set, wherein the backup is an original version created in a format consistent with the alternate storage device; and
  to receive an instruction to set the override before reading the file reference.

11. The apparatus of claim 10, further comprising in which the storage device is a tape drive.

12. The apparatus of claim 11, in which the alternate storage device has a first capacity, and the storage device has a second capacity different from the first capacity.

13. The apparatus of claim 10, in which the processor is further configured to read from a storage device having a different name than specified by the file reference.

14. The apparatus of claim 10, in which the processor is further configured to write to the backup on the storage device in a manner consistent with a storage type of the alternate storage device when the override is set.

* * * * *